(No Model.) 6 Sheets—Sheet 1.
B. F. STEWART.
GRAIN BINDER.
No. 568,810. Patented Oct. 6, 1896.
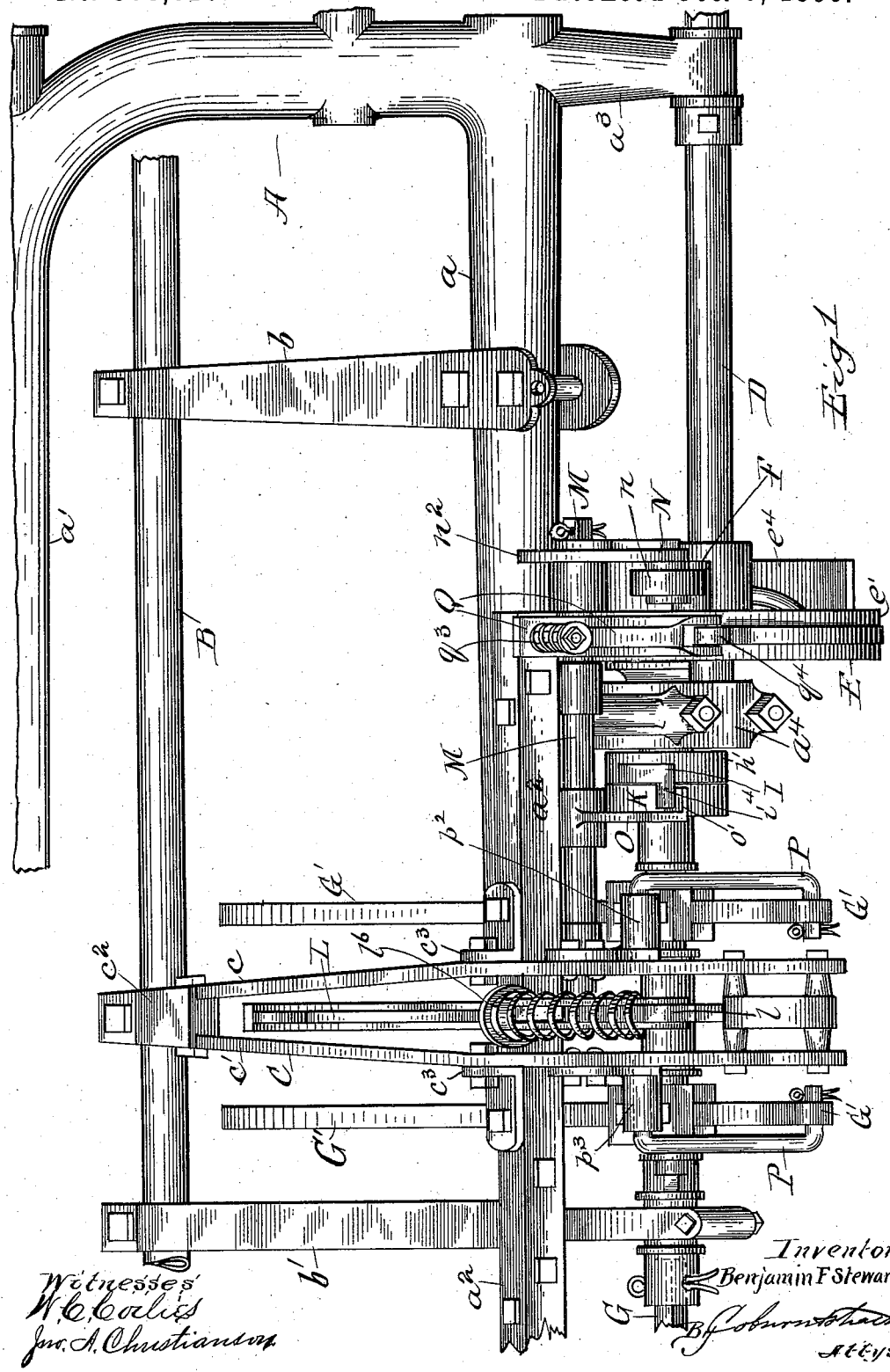
Witnesses
W. C. Corlies
Jno. A. Christianson
Inventor
Benjamin F Stewart
B. F. Coburn & Thacher
Att'ys

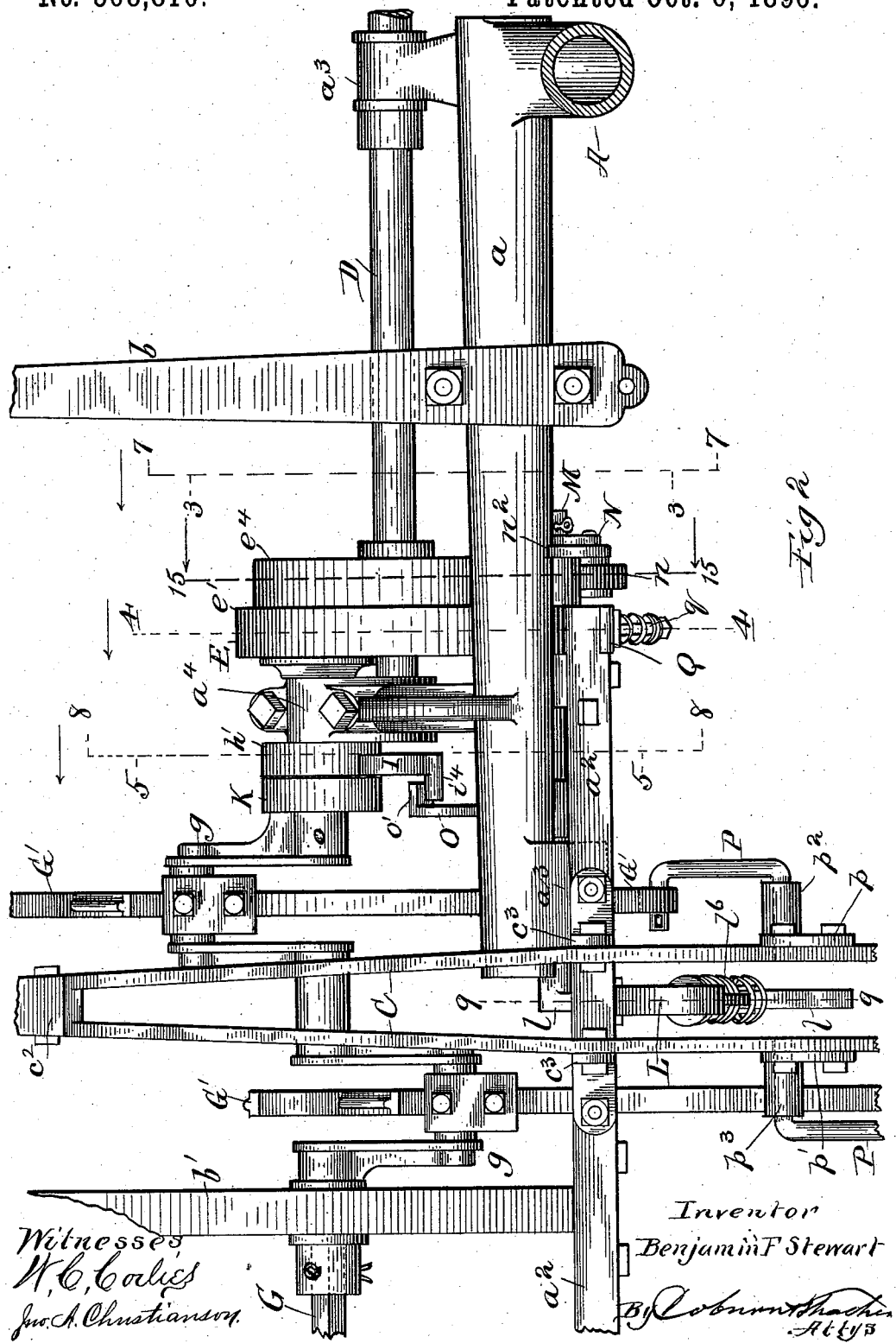

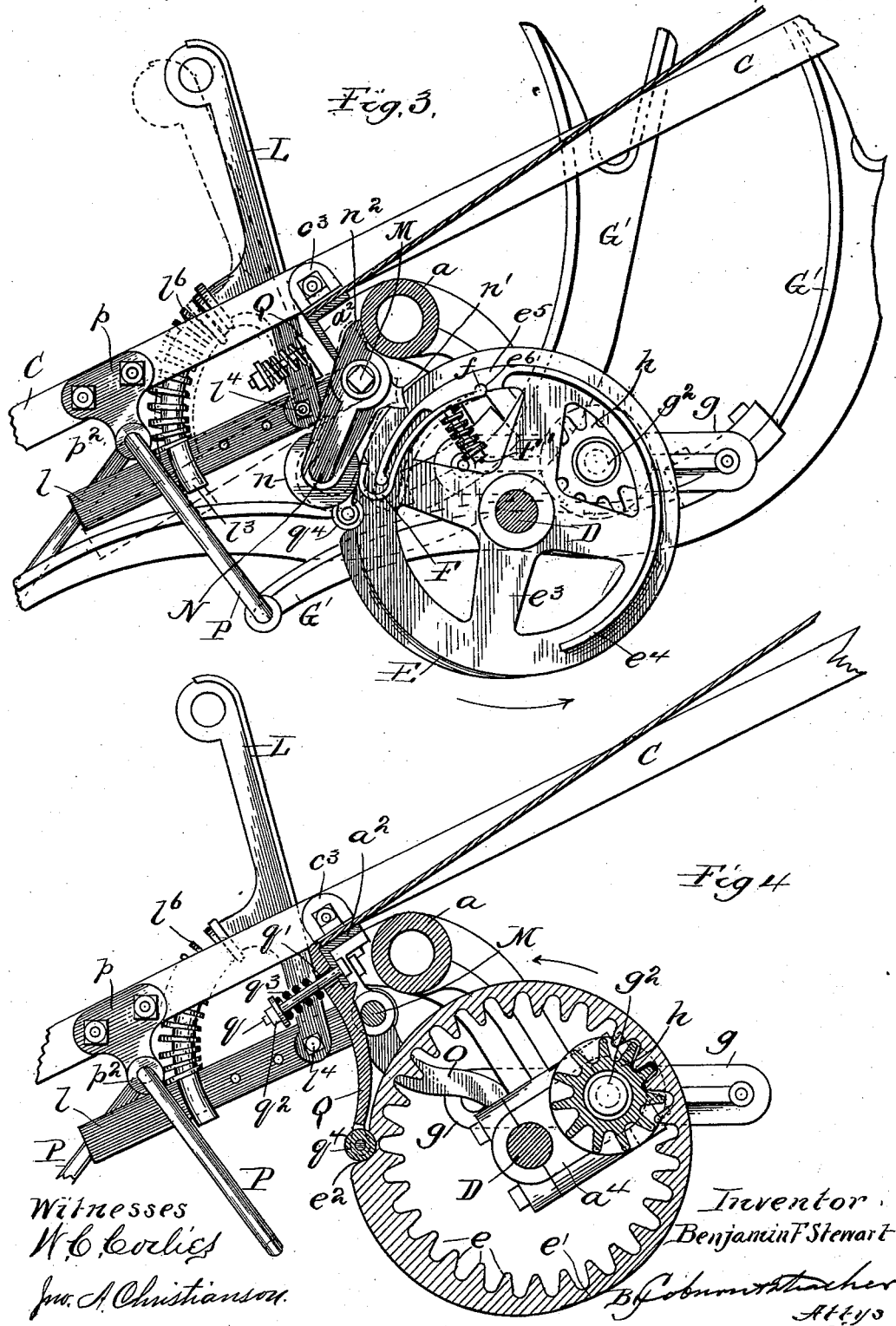

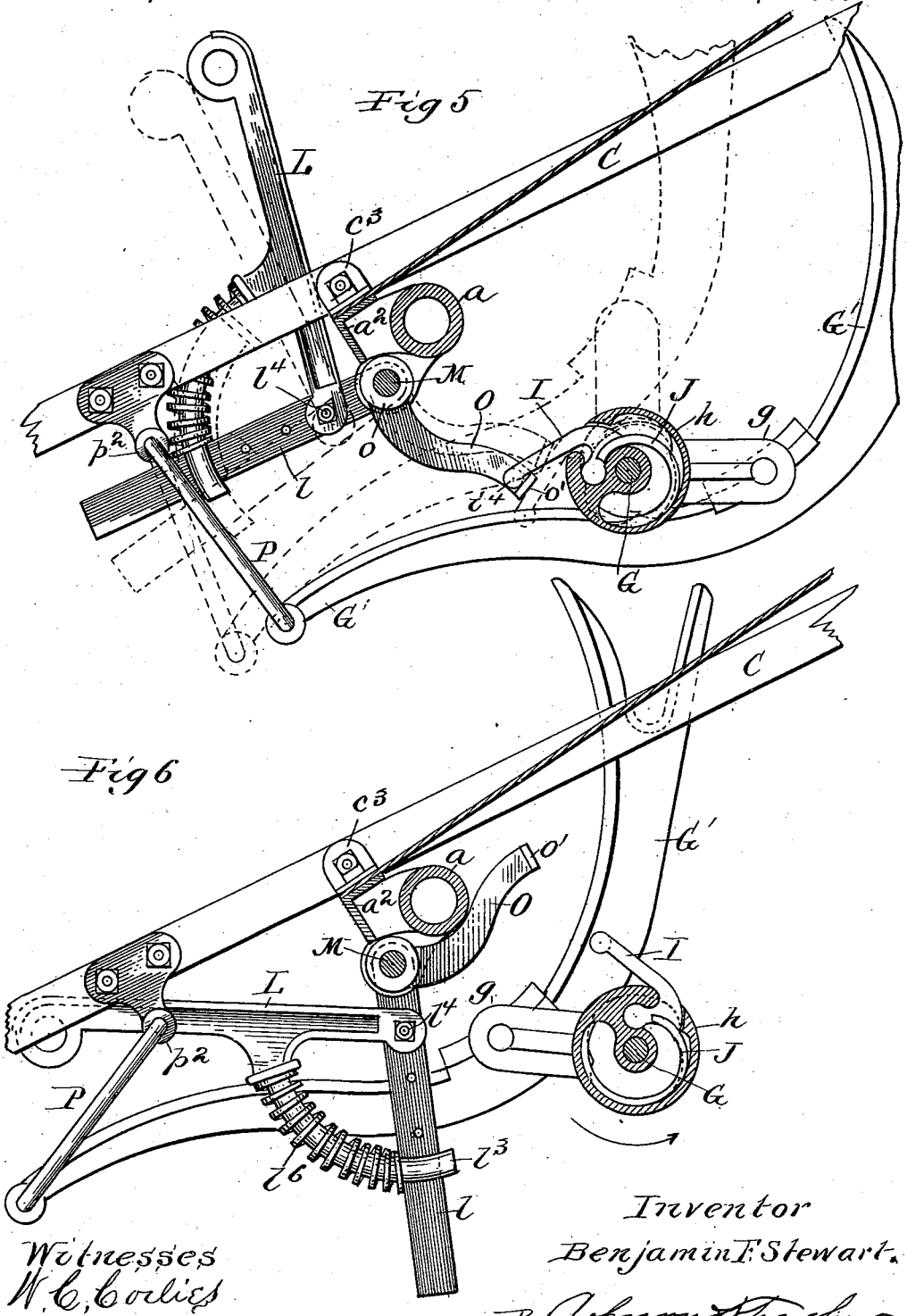

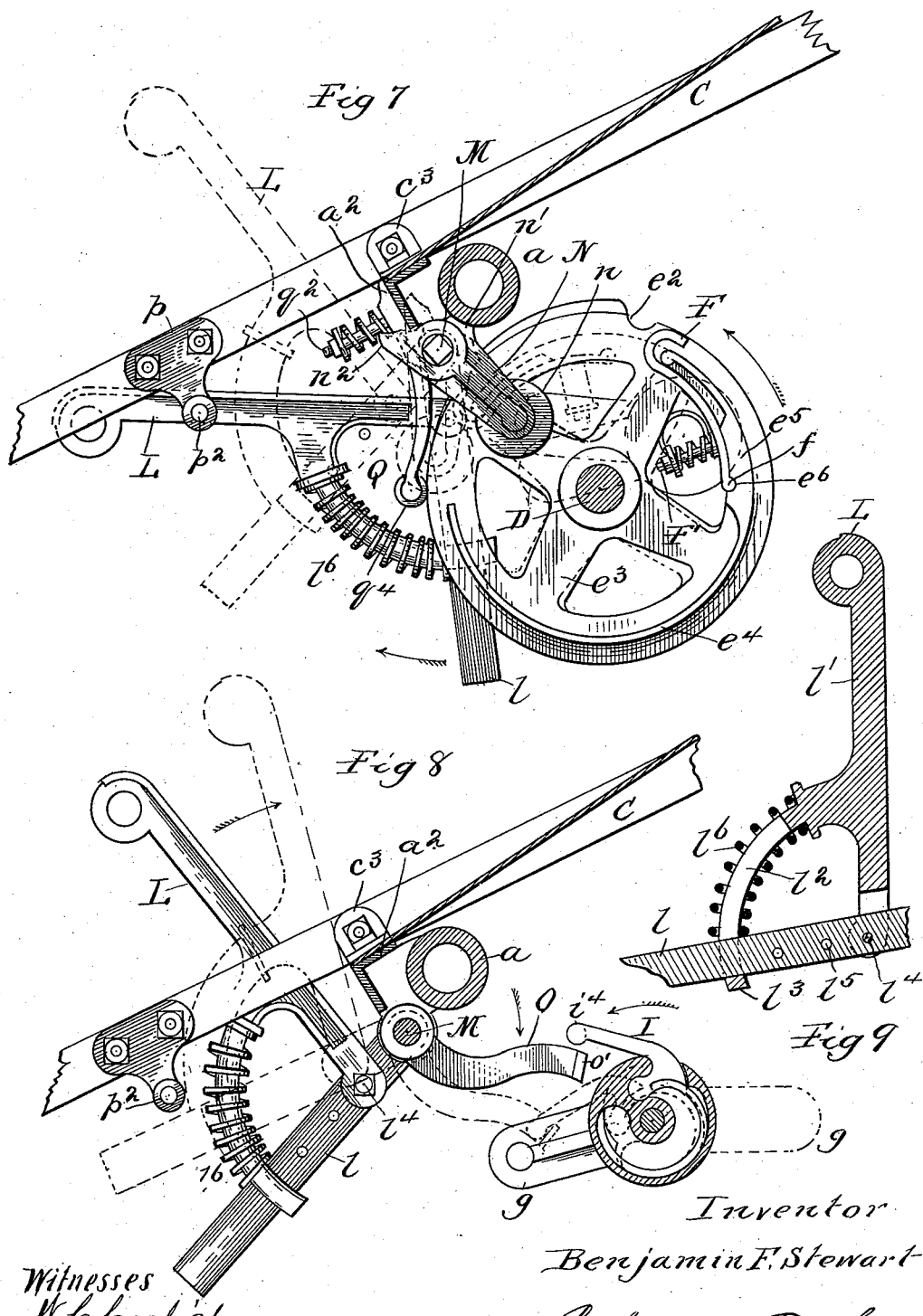

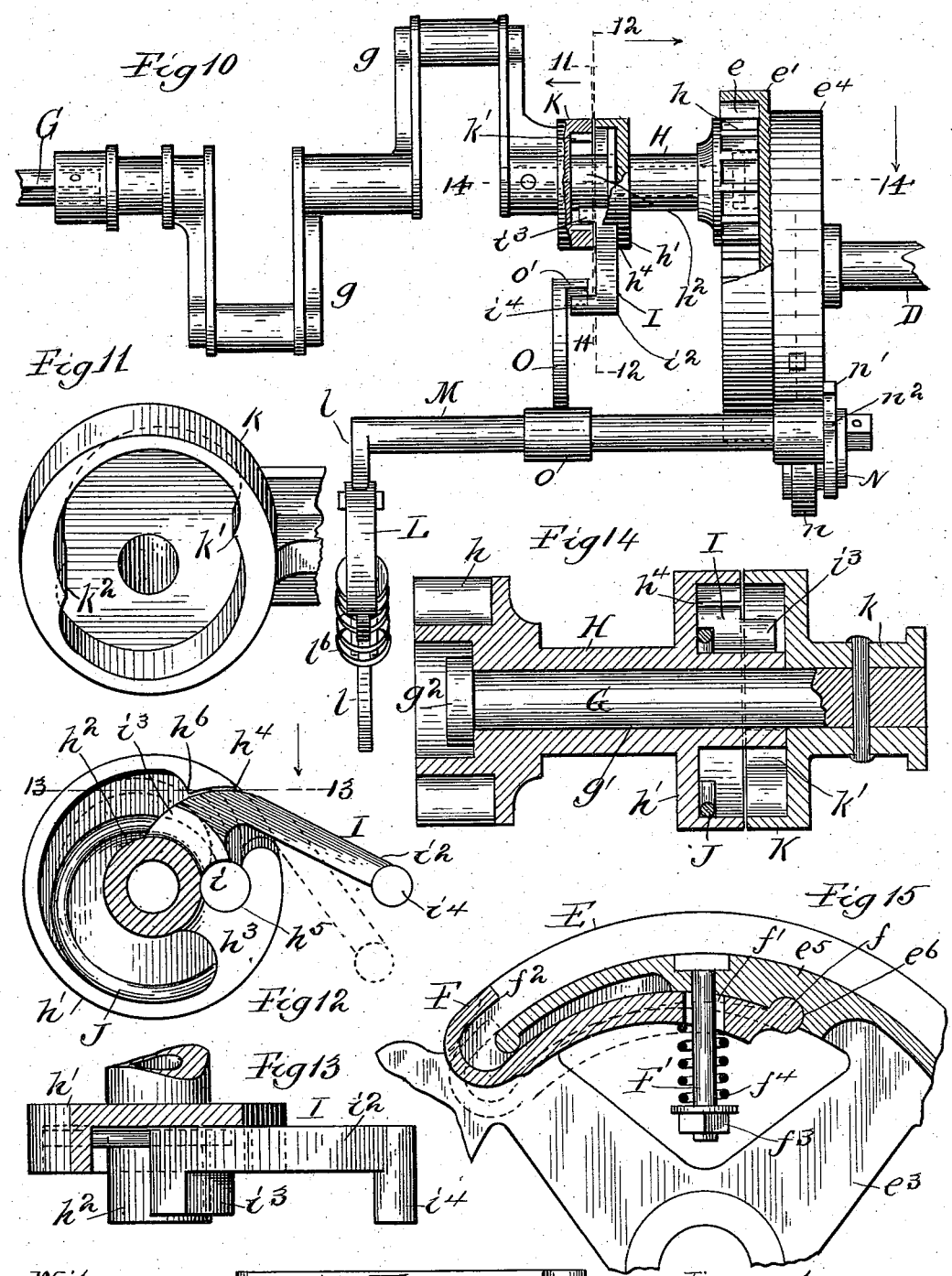

UNITED STATES PATENT OFFICE.

BENJAMIN F. STEWART, OF WEST PULLMAN, ILLINOIS.

GRAIN-BINDER.

SPECIFICATION forming part of Letters Patent No. 568,810, dated October 6, 1896.

Application filed June 24, 1895. Serial No. 553,895. (No model.)

*To all whom it may concern:*

Be it known that I, BENJAMIN F. STEWART, a citizen of the United States, residing at West Pullman, in the county of Cook and State of Illinois, have invented certain new and useful Improvements in Grain-Binders, which are fully set forth in the following specification, reference being had to the accompanying drawings, in which—

Figure 1 is a front elevation of a portion of a grain-binder embodying my improvements; Fig. 2, a plan view of the same with the upper or bent portion of the binder-frame removed; Fig. 3, a cross-section taken on the line 3 3 of Fig. 2, looking in the direction of the arrow; Fig. 4, a similar section taken on the line 4 4 of Fig. 2; Fig. 5, a similar view taken on the line 5 5 of Fig. 2 and looking in the direction of the arrow; Fig. 6, a view of the parts shown in Fig. 5 when unlocked for the discharge of bundles; Fig. 7, a sectional view on the same line as Fig. 3, but with the packer-arms removed and with the crank-arm on the compressor in the open space in the cam-rim on the binding-shaft wheel; Fig. 8, a detail section on the same line as Fig. 5, showing the stop devices just before coming into connection in full lines and in dotted lines just after connection is made, and the clutch disconnected to stop the binding-shaft; Fig. 9, a detail vertical section on the line 9 9 of Fig. 2; Fig. 10, a detail plan showing the packer-shaft, adjacent end of binder-shaft, the clutch-gearing mechanism for connecting the two shafts, and the compressor with its arm for disconnecting the clutch members; Fig. 11, a detail section on the line 11 11 of Fig. 10, looking in the direction of the arrow; Fig. 12, a similar section on the same line of Fig. 10, but looking in the opposite direction toward the other member of the clutch; Fig. 13, a detail plan section taken on the line 13 13 of Fig. 12; Fig. 14, a detail vertical section on the line 14 14 of Fig. 10; Fig. 15, a detail vertical section showing a portion of the binder-shaft, gear-wheel, and flange thereon, taken on the line 15 15 of Fig. 2; and Fig. 16, a bottom plan view of the hooked guide-lever shown in Fig. 15 detached.

In the drawings Figs. 1 to 10, inclusive, are upon one scale and the remaining figures are upon another and enlarged scale.

The present invention relates mainly to the binding mechanism of a grain-binding harvester, and more especially the devices for compressing the bundle and the tripping device, though other parts are included by relation.

A description in detail of so much of the binding mechanism as directly involves this invention and such other parts as may be necessary to an understanding and working thereof will now be given, reference being made to the drawings, and the improvements which are believed to be new and which it is desired to secure by Letters Patent will then be designated more definitely in claims.

As the invention relates to only a certain portion of a grain-binder, a full binder is not shown, and the rest of the machine is dispensed with entirely.

In the drawings, A represents the usual bent support for the binding-arm and its driving-shaft, $a$ representing the horizontal tubular bearing for the driving-shaft, and $a'$, on the upright arm rising from the front end of said bearing, a second tubular bearing for the binding-arm shaft, these two devices, though not shown, being mounted in their bearings and connected together in the usual way.

The usual tube B for the upper support of the binder-frame is mounted in the ordinary way, and the binder-frame is connected thereto by arms or straps $b$ $b'$, the first near the front end of the binder and the second near the rear end thereof. The front connecting device is fastened at its lower end to the tubular bearing $a$, and the rear one in like manner to an extension $a^2$, secured to the rear end of $a$ and extending thence rearward, this extension being angle-shaped, as seen in Figs. 3 to 8, inclusive. The two adjacent ends of these pieces lap and are secured together by a flange $a^3$, passing outward from the tubular bearing $a$ underneath the horizontal member of the angular extension $a^2$. The connecting-arms are mounted loosely on the supporting-tube B, so that they may slide lengthwise thereof for the usual adjustment of the binder. There is also a third connection between the binder-frame and this tubular support. It is a forked or two-part arm C, arranged between the other two supports and near the rear one. This device consists of two arms $c$ $c'$, which are fastened at their upper ends to a block $c^2$, which is mounted loosely on the same tubular support as the arms $b$ $b'$, so as to slide back and forth thereon. These arms spread a little as they pass down toward the main portion of the binder-frame and are secured to the angular extension $a^2$ by means of angular brackets $c^3$, one member of which is fastened to the upper or horizontal web of the latter and the other to the outer sides of the said bars. From these points of fastening the bars are projected forward or outward, so that they extend considerably beyond the lower ends of the other supporting-arms. These extensions are practically parallel and are for a purpose which will be hereinafter described.

The binder-shaft D is journaled in the arm $a^3$ and bracket-support $a^4$ on the same part of the frame, but considerably farther to the rear. A large gear-wheel E is fixed on the binder-shaft near its inner end, the ring of gear-teeth $e$ being on the interior of the rim $e'$, which also has upon its exterior a kind of notch or stop $e^2$, obtained by gradually thickening the rim for a little distance before the stop-face is reached. The wheel is secured to its shaft by means of arms $e^3$, and the rim is flange-like, projecting rearward from the outer ends of the said arms. At the front of this wheel there is a flange $e^4$ of less diameter than the rim of the wheel and broken away a considerable portion of the distance, as seen in Figs. 3 and 7. One end of this flange is just a little in front of the stop on the rim, and a short distance in front thereof the flange is enlarged inwardly somewhat, as seen at $e^5$ in Fig. 15.

A kind of hook-lever F is constructed with a small circular inner end $f$, a semicircular seat $e^6$ for which is provided in the flange projection, but is not constructed to hold it therein. A little way from this joint end this hook-lever has a perforation $f'$, and at its outer end is turned upward and backward upon itself, forming a kind of hook $f^2$, which passes up around the front end of the flange. This hook-lever is held in place on the wheel by means of a pin F', set in the flange, passing inward through the aperture in the lever and some distance beyond the same, having a nut $f^3$ on its inner end and a spring $f^4$ arranged between the nut and the lever, as seen in Figs. 3, 7, and 15. It will be seen that the normal position of this hook-lever under the influence of the spring is with the hook end outward as far as possible; but this end may be compressed or forced inward by any suitable means, the spring yielding for this purpose, as indicated in dotted lines in Figs. 3 and 15.

The packer-arm shaft G is journaled in the bracket-arm $a^4$ and the rear binder-frame strap $b'$. It is provided with cranks $g$, as usual, on which the packer-arms G' are journaled. The packer-arm shaft runs forward to the binding-shaft gear-wheel, but for some distance at its forward end is a plain smooth section $g'$. At the front extremity of the shaft there is a collar or ring $g^2$, and a short tubular shaft H is mounted loosely on the crank-shaft just inside of this collar. The shaft H is provided at its front end with a fixed gear-pinion $h$, which is arranged within the internally-geared wheel on the binding-shaft and engages with the teeth thereof, as seen in Fig. 4. At the other or rear end of this tubular shaft there is an enlarged circular clutch receiver and holder $h'$. The back of this clutch-holder is entire, but the face or front is cut away in irregular form, leaving a bearing-flange $h^2$ and solid section $h^3$ between said bearing and the outer rim. An opening $h^4$ is cut in the rim of this clutch-receiver, just at one side of the connecting-section $h^3$, and in the edge of the said section adjacent to this opening there is provided a concave recess or seat $h^5$. At the opposite side of this opening the flange-rim of the clutch-holder is enlarged inwardly somewhat to provide a kind of inwardly-projecting point $h^6$, the outer face of which is preferably slightly concave, as seen clearly in Fig. 12. The bearing-flange $h^2$ projects beyond the rim of this clutch-holder, the extension being about the same in width as the portion inclosed within the rim.

A clutch-lever I is mounted within the holder $h'$. This lever is substantially of angular form, one arm $i$ being provided with a short journal $i'$, which is seated in the concave recess $h^5$. This arm is curved slightly to correspond with the tubular bearing $h^2$, and the longer arm $i^2$ is joined to the outer end of the short arm on a curved line and extends thence outward, through the opening in the rim of the holder, at an acute angle to the short arm. The two curved edges of these arms, at their meeting inside the holder, form a kind of point on circular lines, and there is a side projection or flange $i^3$, extending outward from this short arm and of the same contour as the arm itself, thus fitting over the outer portion of the bearing-flange $h^2$. The long arm $i^2$ of the lever is also provided at its outer end with a projection $i^4$, extending outward in the same direction as the side flange on the short arm within the holder.

An actuating-spring J is arranged within the holder, being secured at one end to the rim of the latter on the side of the section $h^3$ opposite to the concave seat $h^5$. Thence it extends on a curve around the inside of the holder, and at its outer end, which is free, fits up against the concave edge of the short arm of the lever, but is not fastened thereto. This spring is always under tension, and therefore its normal action will turn the clutch-lever outward until it is stopped by the junction between the two lever-arms coming in contact with the edge of the opening in the rim adjacent to the bearing for the lever-pivot. This is the working position of the said clutch-lever, and is seen in Figs. 6, 8, and 12, the latter being in dotted lines. The companion member K of the clutch is of the same general contour as the member $h'$, but it is secured to the packer-arm shaft G by means of a tubular projection $k$, which is fastened to said shaft by a rivet or bolt. The inner face of the disk portion of this clutch member K sets up against the extremity of the tubular flange of the opposite section, as seen in Fig. 14, the projecting edges of the flanges on the two members being thus brought almost into contact.

On the inner face of the rim-flange of the clutch member K there are projections $k'$ $k^2$, extending radially inward and having their sides or faces curved on a concave, as seen in Fig. 11. These curved faces at their juncture form an edge parallel with the shaft on which the holder is mounted. Only two are shown in the drawings, but the number may be increased, if desired. The outer face of the projecting flange on the short arm of the lever corresponds in curvature with the curves of these two projections in the adjacent holder, and, when the said lever is free to move under the tensile force of its spring, this flange will be thrown out against the inside of the rim on the adjacent holder, and, when brought in contact with one of these inner projections on the latter, the two members will be clutched together. This position of the lever by means of which the two members of the clutch are connected is shown in Figs. 6, 8, and 12, the latter in dotted lines. Obviously the short shaft H is thus connected to the packer-arm shaft and must revolve therewith. As stated above, the gear-pinion on the outer or forward end of this shaft engages with the interior gear of the wheel on the binder-shaft, so that rotation will at once be communicated to the latter and the binding mechanism proper set in motion.

It is well known that in the operation of grain-binders the binder-arm and knotting mechanism must remain at rest during the formation of the gavel, and of course in order to secure this effect some means must be provided for disconnecting the two members of the clutch and holding them in this relation until the gavel is formed and ready for binding, when there must also be provision for relieving the restraint upon the clutch mechanism, so that it will automatically be brought into working connection, as described above. This mechanism will now be explained. The compressor-arm L, against which the gavel is formed by the packer-arms, is pivoted at its lower end to a supporting-arm $l$, which is rigidly fastened to a short shaft M, mounted in bearings below the horizontal stationary portions of the binder-frame $a$ $a^2$. This shaft at the front end extends a little beyond the side flange on the binder gear-wheel E and reaches back thence to a point about midway between the two arms of the forked support to which the packer-arms are connected. The compressor-arm is sustained upon its support by means of a bent or curved projection extending outward and bending or curving downward, the upper portion $l'$ of which is larger than the lower portion $l^2$, and the latter is slotted nearly its entire length, the outer ends being joined, however, by a short cross-piece $l^3$. The space between these two parts of the arms is adapted to accommodate the supporting-bar $l$, to which the compressor-arm is pivoted, and the latter is mounted on this bar by passing the free outer end of the latter through this space and securing the lower end of the compressor-arm to this support by a pivot-bolt $l^4$, passing through any one of a series of apertures $l^5$ along the arm. A spring $l^6$ is arranged upon the lower divided section $l^2$ before the compressor is applied to its support, and when thus applied the free end of this support is passed underneath the lower end of the spring, the latter being held, when the parts are fixed in working position, between the said support and the stop formed by the enlargement of the upper portion of the curved arm, the relation of the parts being such that normally this spring is under sufficient tension to keep the compressor in substantially upright position, as seen in full lines in Figs. 3, 4, and 5. Near the other end of the shaft M there is secured a large but short arm N, which is arranged in the same vertical plane as the projecting flange on the front face of the binder gear-wheel E and carries at its outer end a roller $n$, arranged to contact with said flange and of course free to drop into the open space where the latter is broken away. At its other end this arm is provided with two short lugs, one, $n'$, on the right-hand edge of the arm, as seen in the drawings, and the other, $n^2$, on the left-hand edge, as seen in the drawings, the former being about at right angles to the length of the arm and the latter in line therewith. Both lugs, however, are of sufficient length to come in contact with the tube B as the shaft to which the arm is attached is turned in one direction or the other, thereby limiting the throw of the arm. About midway the length of the shaft M, which may be called the "compressor-shaft," there is secured an arm O by means of a tubular collar $o$. This arm is fixed on its shaft in a position so that when the compressor is upright the arm will extend downward and inward somewhat, being arranged in a plane a little in rear of the outwardly-extending clutch-arm. This arm extends just a little beyond the outer end of the clutch-arm, and at its lower or outer end is provided with a short lug $o'$, extending toward the front of the machine at a right angle to the body of the arm and in practically the same plane as the stud or projection $i^4$ on the outer end of the longer clutch-arm, being normally within or underneath the latter.

As already explained, the packer-arms G' are mounted, as usual, on cranks of the packer-shaft. At their outer ends they are connected by rods P with brackets fastened to the outer faces of the respective members of the forked arm C. These brackets $p$ $p'$ are of substantially triangular shape, the wider part or base of the triangle being fastened to the respective fork-arms, while short and somewhat-tapering arms depend from this plate-section and terminate in tubular lugs $p^2$ $p^3$, extending outward horizontally in opposite directions. The connecting-rods P are hinged or pivoted at their lower ends to the outer extremities of the respective packer-arms, and at their upper ends are in like manner connected to the tubular lugs on the said brackets, the respective rods being provided with short bends at each end standing substantially at right angles to the main body, which end bends form the respective journals for the hinge connection between the stationary brackets and the outer ends of the packer-arms.

In the same vertical plane as the rim of the binder gear-wheel E there is arranged an arm Q, loosely mounted at its upper end upon the angular extension $a^2$. It is secured to the upright web of this angular bar by means of a long bolt $q$, passing through said web and an aperture $q'$, larger than the bolt and near the upper end of the arm. The bolt projects out beyond the arm and is provided with a nut $q^2$ on its outer end, between which and the outer face of the arm there is a spring $q^3$, which is intended to be always under tension for the purpose of holding the arm in working position. The outer or lower end of this arm is provided with a small roller $q^4$, which is adapted to run on the rim of the binder-wheel and is held in contact therewith by the action of the spring just described. The connection of the arm to its support, however, is sufficiently yielding to permit its lower or roller end to move outward slightly, the spring yielding for this purpose and operating to keep the roller end of the arm always in contact with the rim of the binder-wheel. The full deck of the binder is not shown in the drawings, but in Figs. 3 to 8, inclusive, a portion of this deck or incline R is shown in section. It will be understood, of course, that the grain is delivered from the elevator to this deck or incline and moves down toward the compressor, the packing-arms assisting in this and forcing the grain up against the compressor.

The operation of this mechanism is as follows: The relative positions of the mechanisms referred to during the formation of the gavel are shown in Figs. 3, 4, and 5, the first-named in full lines. Only the packer-arms will be operative during this period; but as the gavel is formed against the compressor by the action of the packer-arms the upright compressor will yield outward slightly, as indicated by dotted lines in Figs. 3 and 5. This will of course turn slightly the shaft M and in a direction to give a limited upward turn to the outer end of the stop-arm O, so that it will clear the outer end of the long arm of the clutch-lever, as shown in dotted lines in Fig. 5. Under the influence of the clutch-spring, already described, this will at once connect the packer-shaft with the short tubular shaft mounted loosely on its front end, and, the gear-pinion at the front end of the latter being in engagement with the driving-gear on the binding-shaft, the latter is set in motion. Up to this point of starting the binder the short arm N at the front extremity of the shaft M has the roller at its outer end just in connection with the front or starting end of the flange on the binder-shaft, as seen in full lines in Fig. 3, or rather it will rest on the upward bend or hook of the lever F, but the latter having an elastic support will yield a little to permit a slight turning of the compressor-shaft, which releases the clutch-lever, and this results in connecting the two members of the clutch and so starting the binder-shaft by the revolution of the internal gear-wheel thereon. The roller on the arm N passes at once from the supporting-hook to the rim on the binder gear-wheel, in which position it is held by contact with the rim until the binding of the bundle is completed. The direction in which this binding-gear moves during the operation of binding is indicated by arrows in Figs. 3, 4, and 7, so that the front end of the flange on the binder-wheel will be the end where the hooked lever is located. It will be understood that there is a constant pressure upon the compressor during the operation of binding through the force of the packers working on the bundle. This is resisted so that the binding is continued until the binding-wheel has turned far enough to bring the rear end of its flange underneath the roller-arm, which is long enough for the binding of the bundle. As soon as this point is reached there is nothing to longer support the roller-arm, and the latter immediately drops into the open space within the flange, which permits the compressor to drop into the position shown in Figs. 6 and 7, both in full lines. The bound bundle is then of course discharged, either directly upon the ground or upon a bundle-carrier attached to the machine. Very soon the hook end of the flange referred to will again reach the roller-arm, when of course it will be caught by the bent hook end and lifted out of the recess. This result is produced just before the outward arm of the clutch-lever reaches the projecting lug on the arm O, which, as stated in the description, is in about the same plane as the corresponding projection on the clutch-arm. The stop-lug on the arm, however, is below the lug on the lever, so that when the outer end of the clutch-lever arm $i^2$ is brought around a little farther it will come in contact with the projection on the arm O, and of course will then be turned on its pivot sufficiently to disengage the clutch, bringing the parts into the position shown in full lines in Fig. 5 of the drawings, and a new gavel will be formed, when the same operation of binding will be performed again. The stop $e^2$ on the rim of the binding-gear wheel is for the purpose of preventing this wheel from moving in the wrong direction after the binding has been completed and the bundle discharged, as described. This is effected by means of the stop-arm Q, the outer end of which is elastically held against the rim of the wheel, and the little roller thereon drops from this stop, just as the wheel rests, from the disconnection of the clutch described and as seen in Figs. 3 and 4. Obviously the binding-gear cannot turn now in a reverse direction, but only in the regular working direction, when the machine is again ready to bind a bundle. The wheel E, provided with circular flange $e^4$, partially cut away, as described above, and the hook-lever F, elastically pivoted to the inside of said rim and arranged with reference to the latter, as stated, may be used with stopping and starting devices differing from those here shown and described, provided the general function remains the same. The forked or two-part arm C has a double function. It not only constitutes an additional support for the binder-frame on the tubular journal to which it is connected, but, by the extension of its lower ends outward beyond the binder-frame, it supplies convenient and reliable means for the link connection of the packer-arms, simple, but convenient and efficient in every way.

Having thus described my invention, what I claim to be new, and desire to secure by Letters Patent, is—

1. In a grain-binder, the binder-shaft; the driving-wheel fixed thereon and provided with the internal gear; the packer-shaft; a short tubular shaft loose on the forward end of the packer-shaft, provided at one end with a pinion engaging with the said internal gear of the driving-wheel, mounted in suitable bearings midway its length, and provided at its other end with a clutch; a second clutch on the packer-shaft adapted to engage with the first clutch; and devices for operating the said clutches.

2. In a grain-binder, the binder-shaft in combination with a binder-wheel fixed on the end thereof, and provided with a circular side flange, $e^4$, extending part way around the wheel; a spring device mounted on said flange; the compressor-arm rock-shaft; a compressor-arm mounted on said rock-shaft; an arm, N, provided with a roller adapted to travel on the flange $e^4$, mounted on said rock-shaft; a trip-arm, O, mounted on said shaft, and a clutch mechanism adapted to engage the binder-wheel with a pinion mounted on the packer-shaft, adapted to be operated by the trip-arm, O, substantially as described.

3. In a grain-binder, the binder-shaft, in combination with internally-geared binder-wheel fixed on the rear end thereof and having a forwardly-projecting, circular side flange, $e^4$, extending part way around the wheel, a lever, F, mounted within said rim at the front end thereof and provided with a loop or hook at its outer end extending around and above the forward end of the rim, an actuating-spring within the rim, arranged normally to hold the hooked end of the lever outward beyond the flange, a compressor-arm shaft journaled outside of said wheel and extending to the rear thereof, and an arm, N, fastened to the forward end of said compressor-shaft, provided with a roller on its outer free end arranged to contact with the flange on the binding-wheel during the operation of forming and binding the bundle, but dropping through the opening in said flange to permit the dropping of the compressor and discharge of the bundle, when the binding of the latter is completed, substantially as described.

4. In a grain-binder, a revoluble wheel provided with a circular flange on one side and partly cut away, in combination with a hook-lever elastically pivoted at one end to the inside of said flange and provided at its outer end with a bend or hook turned around a little way over the front end of the flange, the width of the hook-space being considerably greater than the thickness of the flange, and a device connected with the binding mechanism and operated by the said flange and hook to stop and start the binding mechanism, as required in a grain-binder, substantially as described.

BENJAMIN F. STEWART.

Witnesses:
A. A. MURRAY,
I. A. HELMICH.